(12) United States Patent
Chang

(10) Patent No.: US 6,290,161 B1
(45) Date of Patent: Sep. 18, 2001

(54) BRAKING MECHANISM OF WINDER

(76) Inventor: Liang-Jen Chang, No. 132, Fu-I Rd., I-Hsin Li, Tai-Ping City, Taichung Hsien (TW)

( * ) Notice: Subject to any disclaimer, the term of this patent is extended or adjusted under 35 U.S.C. 154(b) by 0 days.

(21) Appl. No.: 09/578,034

(22) Filed: May 25, 2000

(51) Int. Cl.[7] .................................................. B65H 75/30
(52) U.S. Cl. .................................. 242/396.9; 242/156.2; 242/381.6
(58) Field of Search ............................. 242/396.9, 381.6, 242/423.1, 423.2, 156.2

(56) References Cited

U.S. PATENT DOCUMENTS

| | | | | |
|---|---|---|---|---|
| 3,574,339 | * | 4/1971 | Sarah | 242/295 |
| 4,461,435 | * | 7/1984 | Kovalovsky | 242/214 |
| 4,482,106 | * | 11/1984 | Kovalovsky | 242/220 |
| 4,750,687 | * | 6/1988 | Sievert et al. | 242/218 |
| 5,950,949 | * | 9/1999 | Cockerham | 242/289 |

FOREIGN PATENT DOCUMENTS

1114838 * 5/1968 (GB) .

* cited by examiner

Primary Examiner—Donald P. Walsh
Assistant Examiner—Joseph Rodriguez
(74) Attorney, Agent, or Firm—Browdy and Neimark

(57) ABSTRACT

A winder comprises a base, a wire wheel, and a braking mechanism. The base has a face plate which is provided with a main shaft and at least one arcuate hole. The wire wheel is rotatably mounted on the main shaft. The braking mechanism comprises a one-way bearing, a shaft sleeve, a brake disk, two friction pads, a clamp seat, and an adjustment knob. The one-way bearing is disposed in the axial hole of the wire wheel. The shaft sleeve is fitted over the main shaft such that a first end thereof is in contact with the inner edge of the bearing, and that a second end thereof is fastened with the brake disk. The friction pads are fastened with the shaft sleeve and located at two sides of the brake disk. The clamp seat is slidably disposed on the shaft sleeve and is fastened with the adjustment knob. The magnitude of frictional force between the brake disk and the friction pads is adjusted by turning the adjustment knob, thereby resulting in a braking effect on the wire wheel in motion.

10 Claims, 4 Drawing Sheets

BRAKING MECHANISM OF WINDER

FIELD OF THE INVENTION

The present invention relates generally to a winder, and more particularly to a braking mechanism of the winder.

BACKGROUND OF THE INVENTION

As shown in FIGS. 1 and 2, a prior art winder comprises a wire wheel 8, which is stopped by a resistance force brought about by an adjustment disk 3 having inner threads 4, a press ring 5 having outer threads 6, and a press rod 7 which is put through the through hole 2 of a housing 1 to press against a brake piece. Such a prior art braking mechanism as described above is defective in design in that its braking force is not uniformly distributed, and that it is designed for use by a right-handed person.

SUMMARY OF THE INVENTION

The primary objective of the present invention is to provide a winder with an effective and reliable braking mechanism.

It is another objective of the present invention to provide a winder with a braking mechanism capable of being adjusted in magnitude and direction of the braking force.

The winder comprises a base, a wire wheel, and a braking mechanism. The base is formed of a face plate which is provided with at least one arcuate hole, and a main shaft extending from the face plate. The wire wheel is provided with an axial hole and is rotatably mounted on the main shaft. The braking mechanism comprises a one-way bearing which is disposed in the axial hole of the wire wheel, a shaft sleeve fitted over the main shaft such that a first end thereof is in contact with the inner edge of the one-way bearing, a brake disk mounted on the second end of the shaft sleeve two friction pads arc fastened with the shaft sleeve such that they are located at two sides of the brake disk, a clamp seat slidably disposed on the body of the shaft sleeve, and an adjustment button. The clamp seat comprises a base plate, a through hole for receiving the shaft sleeve, and at least one arcuate plate extending from the base plate to insert into the arcuate hole. The adjustment button is fastened with the arcuate plate and is used to adjust the extent to which the brake disk and the friction pads are held tightly between the base plate and the face plate by the clamp seat. The wire wheel is encountered with a minimum friction force at the time when the wire wheel is turned in a first direction. As the wire wheel is turned in a second direction, the shaft sleeve and the brake disk are actuated to turn by the one-way bearing, thereby resulting in a full-scale friction between the brake disk and the friction pads.

DETAILED DESCRIPTION OF THE INVENTION

Figure 1:
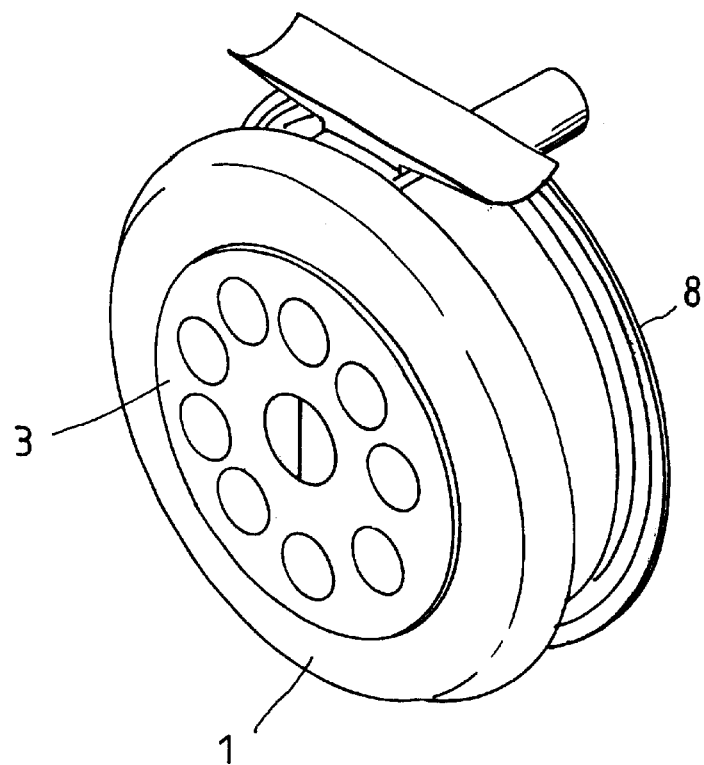
FIG. 1 shows a perspective view of a prior art winder.
Figure 2:
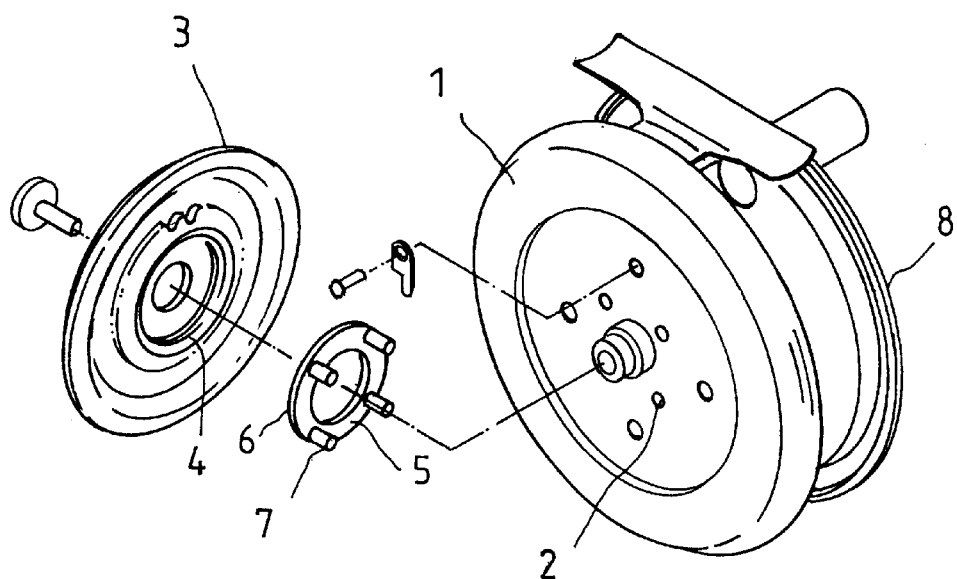
FIG. 2 shows an exploded view of the prior art winder.
Figure 3:
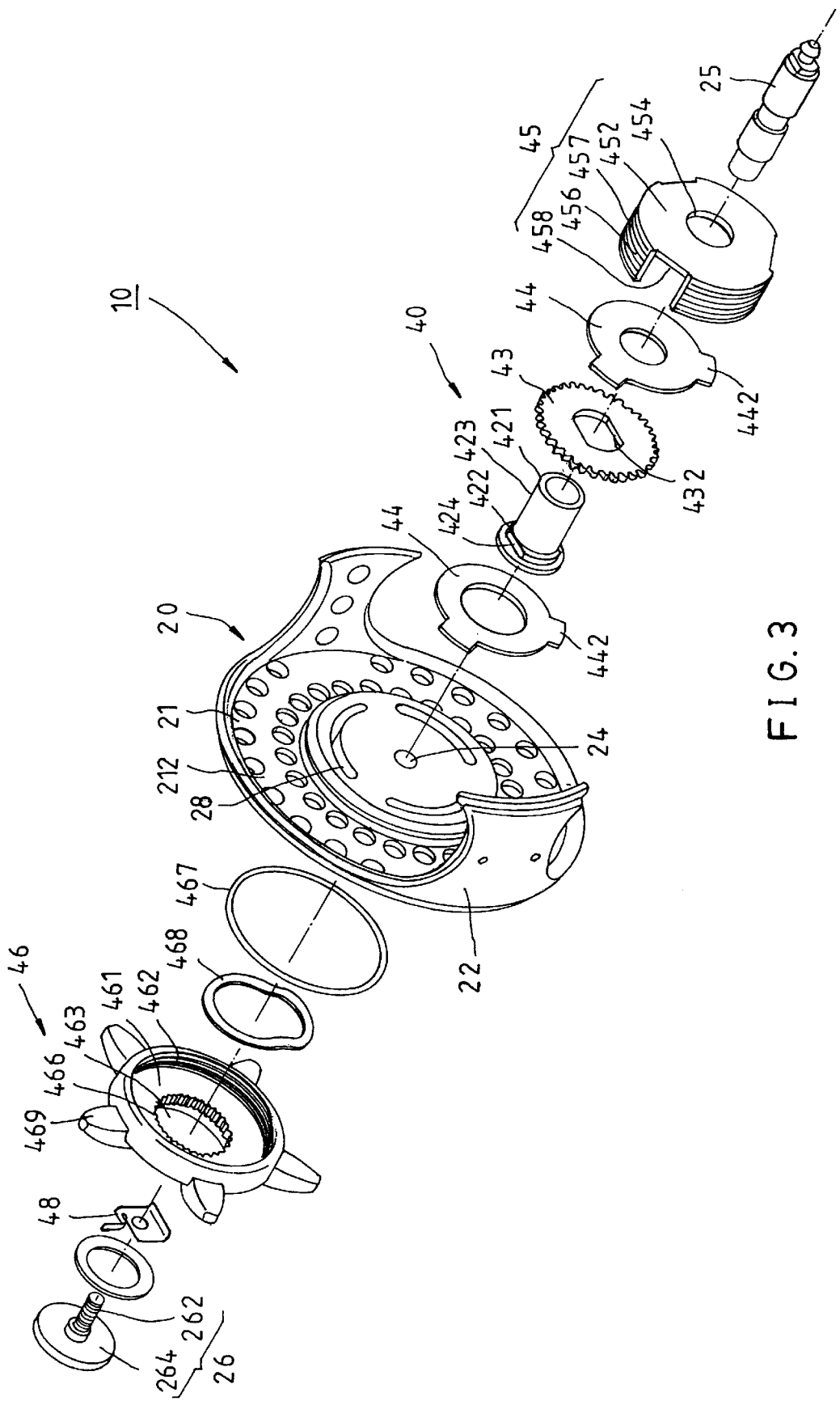
FIG. 3 shows a partial exploded view of a preferred embodiment of the present invention.
Figure 4:
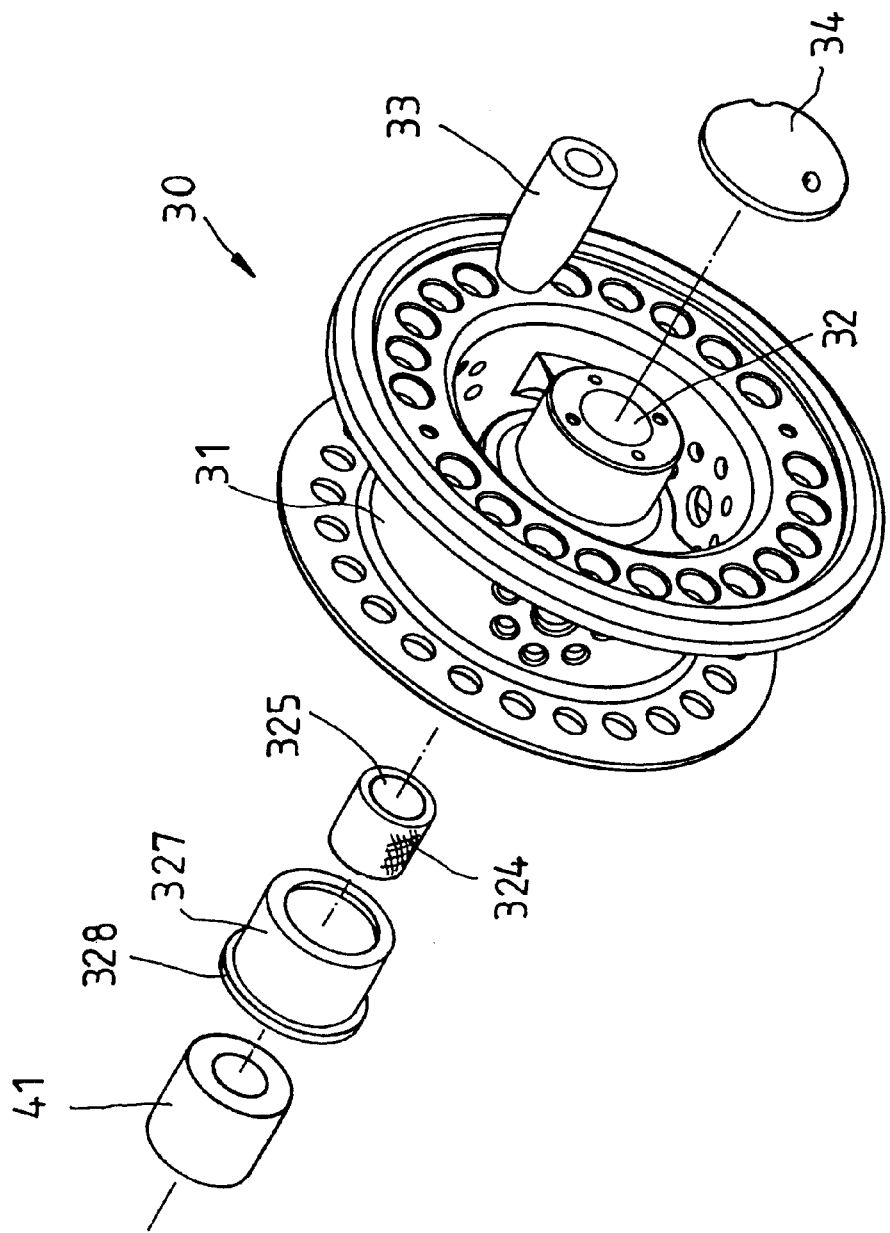
FIG. 4 shows an exploded view of the preferred embodiment of the present invention.
Figure 5:
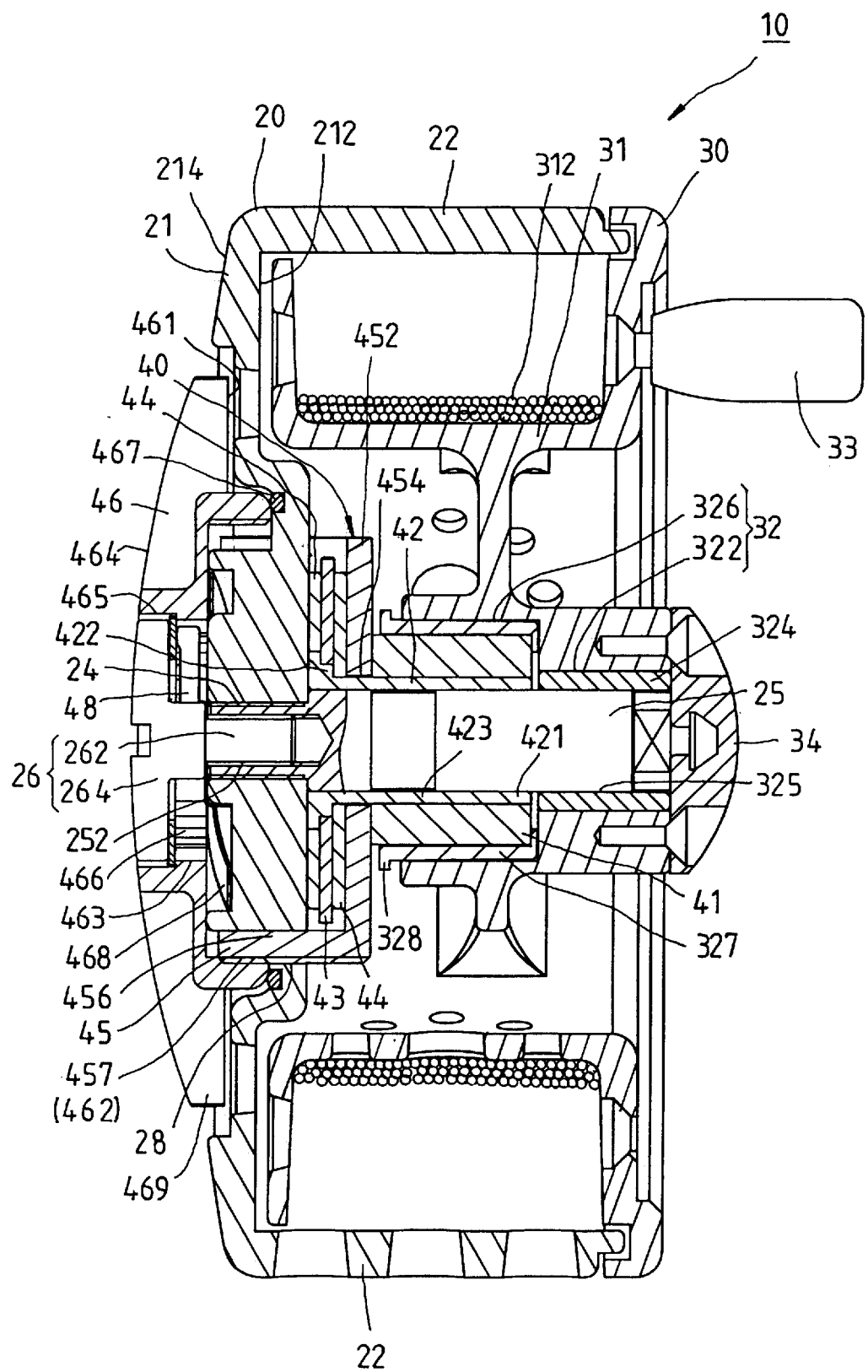
FIG. 5 shows a sectional view of the preferred embodiment of the present invention in combination.

As shown in FIGS. 3–5, a winder 10 embodied in the present invention comprises a base 20, a wire wheel 30, and a braking mechanism 40.

The base 20 is formed of a round face plate 21, two protective plates 22 extending respectively from two opposite ends of the face plate 21, and a main shaft 25 extending from the inner side 212 of the face plate 21 via a through hole 24 of the face plate 21 such that an inner threaded portion 252 of the main shaft 25 is engaged with a bolt 26. The main shaft 25 is thus detachably fastened with the base 20. The face plate 21 is further provided with three arcuate holes 28 which are located in a common circumference such that the through hole 24 serves as a curvature center of each of the arcuate holes 28.

The wire wheel 30 is provided in the rim with a wire receiving portion 31 of a U-shaped cross section for containing a wire or fishing line 312. The wire wheel 30 is provided in the center with an axial hole 32 by which the wire wheel 30 is rotatably mounted on the main shaft 25. The wire wheel 30 is provided with a handle 33 fastened pivotally thereto, and a fast knob 34 for sealing off the axial hole 32. The fast knob 34 is provided with a retaining projection which is connected with the main shaft 25 such that the main shaft 25 is separated from the wire wheel 30 by wrenching the retaining projection. The axial hole 32 has a small diametrical portion 322 and a large diametrical portion 326. A copper bushing 324 is disposed in the small diametrical portion 322 and is provided with an inner hole 325 for receiving the main shaft 25. A fastening sleeve 327 is inserted into the large diametrical portion 326 such that a protrusion 328 of the fastening sleeve 327 urges the wall of the large diametrical portion 326.

The braking mechanism 40 comprises a one-way bearing 41 which is inserted into the fastening sleeve 327, a shaft sleeve 42 fitted over the main shaft 25 such that a first end 421 thereof is in contact with the inner edge of the bearing 41. The shaft sleeve 42 has a second end 422 which is provided in the fringe with two planar surfaces 424. A brake disk 43 has a connection hole 432 complementary in shape to the fringe of the second end 422 of the shaft sleeve 42. Two friction pads 44 are fastened with the shaft sleeve 42 and are located at two sides of the brake disk 43. The friction pads 44 are provided with two protruded portions 442. A clamp seat 45 is slidably mounted on a body 423 of the shaft sleeve 42. An adjustment knob 46 is fastened with the clamp seat 45 and is located at the outer side 214 of the face plate 21 of the base 20.

The clamp seat 45 comprises a base plate 452 which is provided in the center with a through hole 454 for receiving the shaft sleeve 42, and three arcuate plates 456 extending from the base plate 452 to enter the arcuate holes 28. As a result, the clamp seat 45 is incapable of rotation relative to the base 20. The arcuate plates 456 are provided with three notches 458 for receiving the protruded portions 442 of the friction pads 44. As a result, the friction pads 44 can not be turned in relation to the clamp seat 45. The arcuate plates 456 are provided in the fringe with an outer threaded portion 457.

The adjustment knob 46 is provided in an inner side 461 with an inner threaded portion 462, which is engaged with the outer threaded portion 457 of the arcuate plates 456. The adjustment knob 46 is further provided in the center with a through hole 463 for receiving a shank 262 of the bolt 26. The bolt 26 has a head 264 which urges a receiving slot 465 of an outer side 464 of the adjustment knob 46. As a result, the adjustment knob 46 is prevented from being separated from the clamp seat 45 at such time when the adjustment knob 46 turns in relation to the base 20. A ring 467 and a wavy pad 468 are disposed between the adjustment knob 46 and the base 20 for providing a cushioning effect. The outer side 464 of the adjustment knob 46 is provided with five claws 469 to facilitate the turning of the adjustment knob 46. The through hole 463 is provided in the inner wall with a plurality of teeth 466 for cooperating with a ticktack piece 48 to bring about a recurring sound like the ticking of a clock at the time when the adjustment knob 46 is turned.

In operation, when the wire wheel 30 is turned in the first direction, the wire wheel 30 and the fastening sleeve 327 turn in the outer edge of the one-way bearing 41 with a minimum friction force. If the wire wheel 30 is turned in the second direction, the one-way bearing 41 turns along with the wire wheel 30 and the fastening sleeve 327. In the meantime, the shaft sleeve 42 and the brake disk 43 are actuated to turn. In light of the two friction pads 44 being held by the base plate 452 of the clamp seat 45 and the face plate 21 of the base 20, the two friction pads 44 are fixed such that the friction pads 44 are in a full-scale intimate contact with the brake disk 43, thereby providing the brake disk 43 with a strong and even friction force. The wire wheel 30 in motion can be thus slowed down or stopped effectively.

The magnitude of the braking force can be regulated by turning the adjustment knob 46 to adjust the extent of tightness to which the brake disk 43 and the friction pads 44 are clamped between the base plate 452 and the face plate 21 of the base 20 by the clamp seat 46.

The rotational direction of the wire wheel 30 can be altered by wrenching the retaining projection of the fast knob 34 to cause the wire wheel 30 to become separated from the base 20. The fastening sleeve 327 and the one-way bearing 41 are removed such that the one-way bearing 41 is turned around to plug along the fastening sleeve 327 into the axial hole 32, and that the wire wheel 30 is reassembled.

What is claimed is:

1. A winder comprising:
   a base formed of a face plate and a main shaft extending from said face plate, said face plate being provided with one or more arcuate holes which are located in a common circumference;
   a wire wheel provided with an axial hole for receiving said main shaft of said base, said wire wheel being rotatably mounted on said main shaft; and
   a braking mechanism comprising a one-way bearing which is disposed in said axial hole of said wire wheel, a shaft sleeve fitted over said main shaft such that a first end thereof is connected with an inner edge of said one-way bearing, a brake disk retained by a second end of said shaft sleeve, two friction pads fastened said shaft sleeve and located at two sides of said brake disk, a clamp seat slidably mounted on a body of said shaft sleeve, and an adjustment knob;
   wherein said clamp seat comprises a base plate, and one or more arcuate plates extending from said base plate to put into said arcuate holes so as to prevent said clamp seat from turning in relation to said base, said base plate provided in a center thereof with a through hole for receiving said shaft sleeve, said arcuate plates provided with threads; wherein said adjustment knob is fastened with said arcuate plates of said clamp seat and is located at the outer side of said face plate of said base whereby said adjustment knob is turned to adjust the extent of tightness to which said brake disk and said friction pads are clamped between said base plate and said face plate of said base by said clamp seat.

2. The winder as defined in claim 1, wherein said clamp seat of said braking mechanism is provided with three arcuate plates, with each having three notches.

3. The winder as defined in claim 2, wherein said face plate of said base is provided with three arcuate holes corresponding in location to said arcuate plates.

4. The winder as defined in claim 2, wherein said friction pads are provided with at least one protruded portion whereby said protruded portion is retained in said notches of said clamp seat so as to prevent said friction pad from turning in relation to said clamp seat.

5. The winder as defined in claim 4, wherein said friction pads are provided with two protruded portions.

6. The winder as defined in claim 1, wherein said second end of said shaft sleeve is provided in an outer surface with two planar surfaces; wherein said brake disk is provided with a connection hole complementary in shape to the outer surface of said second end of said shaft sleeve whereby said connection hole is intended to receive said shaft sleeve.

7. The winder as defined in claim 1, wherein said threads of said clamp seat are located on an outer edge of said arcuate plates; wherein said adjustment knob is provided with an inner threaded portion for meshing with said threads of said arcuate plates.

8. The winder as defined in claim 1, wherein said face plate of said base is provided in a center with a through hole for receiving said main shaft whereby said main shaft is provided with an inner threaded portion meshing with a bolt.

9. The winder as defined in claim 8, wherein said adjustment knob is provided in a center with a through hole for receiving a shank of said bolt such that a head of said bolt urges an outer edge of said adjustment knob so as to prevent said adjustment knob from being separated from said clamp seat at the time when said adjustment knob turns in relation to said base.

10. The winder as defined in claim 1 further comprising a fastening sleeve having a protrusion whereby said fastening sleeve is removably disposed between said one-way bearing and said axial hole of said wire wheel such that said protrusion of said fastening sleeve urges an edge of said axial hole, and that said fastening sleeve and said one-way bearing are removed together from said axial hole to enable said one-way bearing to be turned around before said one-way bearing and said fastening sleeve are plugged back into said axial hole for bringing about a braking effect on said wire wheel.

* * * * *